United States Patent [19]
Ingestad et al.

[11] 3,896,003
[45] July 22, 1975

[54] PROCESS AND MEDIUM FOR THE CULTIVATION OF MICROORGANISMS TO ACHIEVE OPTIMUM GROWTH AND YIELD

[75] Inventors: Nils Torsten Ingestad, Jakobsberg; Nils Ludvig Molin, Sollentuna, both of Sweden

[73] Assignee: AB Marabou, Sundyberg, Sweden

[22] Filed: Mar. 19, 1973

[21] Appl. No.: 342,742

[30] Foreign Application Priority Data

Mar. 20, 1972 Sweden .............................. 3535/72

[52] U.S. Cl. .................. 195/100; 195/99; 195/101; 195/102

[51] Int. Cl. .............................................. C12k 1/10

[58] Field of Search ................ 195/99, 100, 96, 115

[56] References Cited

UNITED STATES PATENTS 3,139,382 6/1964 Killinger ........................ 195/115 X

*Primary Examiner*—Lionel M. Shapiro
*Assistant Examiner*—Robert J. Warden
*Attorney, Agent, or Firm*—Brumbaugh, Graves, Donohue & Raymond

[57] ABSTRACT

A process for cultivating a microorganism to obtain maximal cell mass production and maximal utilization of the nutrient medium which comprises adding to the microorganism a nutrient medium wherein the weight proportions of the nutrient elements correspond to those present in the cultivated microorganism at its predetermined optimum growth and yield conditions. A novel microbiological cultivation medium comprises the nutrient elements in the optimum growth and yield proportions of the organism to be cultivated.

3 Claims, No Drawings

PROCESS AND MEDIUM FOR THE CULTIVATION OF MICROORGANISMS TO ACHIEVE OPTIMUM GROWTH AND YIELD

The present invention relates to a process and a nutrient medium for the cultivation of microorganisms to obtain maximal production of cell mass and maximal utilization of the cultivation medium.

There are a great number of mineral nutrient media for the cultivation of microorganisms. Heretofore known media all have element compositions which are not balanced; that is, their elemental composition will vary during cultivation due to the unproportional uptake of the nutrient elements in relation to the composition of the medium. This imbalance causes an impoverishment of one or more nutrient elements and an excess of one or more other nutrient elements in the medium which results in a reduced yield and growth for the cultivated microorganism. Where an impoverishment of one or more nutrient elements occurs, the reason for a reduced yield is evident. On the other hand, where an excess of one or more nutrient elements is obtained in the medium, the microorganism can absorb too much of a nutrient element in certain cases which we have discovered inhibits growth and, in turn, reduces production and yield. Therefore, an increase of a certain nutrient element or elements can bring about a disturbance of the nutrient uptake from the medium by an influence on the cell walls of the microorganism. Moreover, we have found that in order to be able to carry out a continuous cultivation of the microorganism, a simple, defined starting and dosage medium must be determined and maintained so that additions of unneeded nutrient elements are avoided.

Accordingly, the object of the invention is to obtain a starting and dosage medium for the cultivation of microorganisms, as well as a process for the cultivation of microorganisms, to achieve improved growth and yield without obtaining any nutrient imbalance in the composition of the medium.

It has now been found that it is impossible to attain the objectives of the invention by adding to a microorganism culture a nutrient medium wherein the weight proportions of the different mineral nutrient elements correspond to those present in the cultivated microorganism at its maximal growth and yield. Once the weight proportions of nutrient elements in the microorganism at its optimum growth and yield have been determined, continuous addition of nutrient elements can readily be achieved by intermittently adding additional nutrient sources to the medium in response to variations in either the pH or concentration, or both, of the medium. The amount of each nutrient dosage subsequently added will correspond to changes in the weight proportion of the nutrients in the microorganism due to nutrient uptake by consumption over given time intervals so as to maintain optimal growth and yield conditions.

According to a specific embodiment of the invention, a medium for a methanol oxidizing bacteria, preliminarily called *Methylomonas methanolica*, NRRL B-5458, is prepared which, in addition to a suitable source of carbon, preferably methanol, contains the mineral nutrient elements nitrogen (N), phosphorus (P), potassium (K), sulphur (S), calcium (Ca), magnesium (Mg), and iron (Fe) in weight proportions within the following ranges:

| | |
|---|---|
| Nitrogen | 100 |
| Phosphorus | 22.5–27.5 |
| Potassium | 2.25–2.75 |
| Sulphur | 8.1–9.9 |
| Calcium | 1.35–1.65 |
| Magnesium | 1.8–2.2 |
| Iron | 2.25–2.75 |

Preferably, these nutrient proportions are:

| | |
|---|---|
| Nitrogen | 100 |
| Phosphorus | 25 |
| Potassium | 2.5 |
| Sulphur | 9.0 |
| Calcium | 1.5 |
| Magnesium | 2.0 |
| Iron | 2.5 |

In the specific embodiment, the concentration of the nutrient medium should be so high that the concentration of phosphorus is 50 to 250 millimoles (1.55 to 7.75 g of phosphorus per litre of medium) during the logarithmic and stationary phases of the cultivation, while the concentration is 1 to 5 millimoles of phosphorus in the introductory phase of the cultivation. The concentration 1 millimole of phosphorus thereby corresponds to 124 mg of nitrogen per litre of solution, 5 millimoles of phosphorus is 620 mg of nitrogen per litre, 50 millimoles of phosphorus is 6.2 g of nitrogen per litre, and 250 millimoles of phosphorus is 31 g of nitrogen per litre of medium when the weight proportion between nitrogen and phosphorus is 100:25.

A balanced medium is necessary for a continuous cultivation with a recirculation of the cultivation medium as otherwise a rapid distortion of the composition of the medium will occur. A balanced medium is also a presumption for a recirculation as it is then balanced even after the fermentation, so that a simple addition of new medium to the original concentration may take place. This step gives an optimal utilization of mineral salts and water, whereby a good economy is obtained. Further economical advantage is to be seen in the reduced load on waste water pyrification plants.

The proposed mineral nutrient compositions of the present invention may be used in the form of a liquid medium or a solid medium, for example, as media containing agar-agar.

The present invention will be described in further detail in the following example which is intended only to illustrate the invention and not to restrict its scope in any way:

EXAMPLE

On the basis of analyses of media and biomasses, at which it was shown that the macroelements were consumed in a constant relationship to the consumption of nitrogen, a liquid dosage medium was prepared for the microorganism, preliminarily called *Methylomonas methanolica*, NRRL B-5458, which medium had the following composition between the macro mineral nutrient elements in relation to nitrogen (weight proportions):

| | |
|---|---|
| N | 100 |
| P | 25.0 |
| S | 9.0 |
| K | 2.5 |
| Mg | 2.0 |
| Ca | 1.5 |
| Fe | 2.5 |

These macro elements were present in the form of the following substances:

| | |
|---|---|
| $NH_3$ in an amount of 24.28 g/l | |
| $KH_2PO_4$ | 1.74 |
| $Ca(H_2PO_4)_2.2H_2O$ | 1.88 |
| $H_3PO_4$ | 13.02 |
| $H_2SO_4$ | 3.52 |
| $MgSO_4.7H_2O$ | 2.05 |
| $Fe(SO_4)_3$ | 1.79 |

Moreover, the following micro elements are present in relation to nitrogen 100 (weight proportions):

| | |
|---|---|
| Cu | 0.08 |
| Zn | 0.08 |
| Mn | 0.01 |
| B | 0.001 |
| Mo | 0.001 |
| Co | 0.001 |

in the form of

| | |
|---|---|
| $CuCl_2 \times 2H_2O$ in an amount of 43.0 mg/l | |
| $ZnSO_4 \times 7H_2O$ | 70.2 |
| $MnSO_4 \times 1H_2O$ | 6.02 |
| $H_3BO_4$ | 1.14 |
| $Na_2Mo_4$ | 0.6 |
| $CoCl_2 \times 6H_2O$ | 0.8 |

This balanced medium was used in the cultivation of the above-mentioned microorganism, *Methylomonas methanolica*, NRRL B-5458, with an addition of methanol (0.15 percent volume by volume).

For cultivation, a Biotec LP 100 fermentor with automatic temperature and pH control and a stepless driving unit with a magnetic coupling to an 8-blade impeller was used. The working volume was 2 or 4 litres. Maximal oxygen transfer rate was 300 millimoles of $O_2$ per litre an hour at a stirring rate of 1200 rpm and an aeration rate of 1.5 VVM. pH was controlled by the addition of 1M $NH_4OH$. The concentration of methanol in the medium was measured and controlled by means of a methanol analysator. Dissolved oxygen was measured by means of a probe according to Johnson, M. J., Borkowski, J., and Engblom, C., Biotechn. Bioeng. 6, 437 (1964). The values for dissolved oxygen, concentration of methanol, pH, amount of $NH_4OH$ added, and the amount of methanol consumed were registered continuously. The cultivation temperature was 30°C. and pH 6.0.

The starting concentration of the balanced medium, i.e., in the beginning of the cultivation, corresponded to 0.4 g of nitrogen per litre of medium. The concentration of the dosage medium, i.e., when the cultivation reached the logarithmic phase, corresponded to 20 g of nitrogen per litre of medium.

For comparison, a previously known and used medium was used having the following weight proportions between the elements present: N:100; P:106; K:55; S:12.3; Ca:0.04; Mg:9.4; Fe:0.8; Cu:0.009; Zn:0.009; Mn:0.009; Mo:0.004; and Co:0.009, whereby the salts present were:

| | |
|---|---|
| $NH_4Cl$ in an amount of 800.00 mg/l | |
| $Na_2HPO_4$ | 600.00 |
| $KH_2PO_4$ | 400.00 |
| $MgSO_4 \times 7H_2O$ | 200.00 |
| $CaCl_2 \times 2H_2O$ | 0.33 |
| $FeCl \times 6H_2O$ | 8.35 |
| $CuSO_4 \times 5H_2O$ | 0.08 |
| $ZnSO_4 \times 7H_2O$ | 0.09 |
| $MnSO_4 \times 4H_2O$ | 0.08 |
| $Na_2MoO_4 \times 2H_2O$ | 0.02 |
| $CoCl_2 \times 6H_2O$ | 0.09 |

The amount of methanol used was 0.3 percent volume by volume. The pH was 6.7.

By comparison, a longer logarithmic phase was obtained for the invention as well as a total yield of 18.0 g of biomass per litre compared to 7.2 g per litre for the known medium. The over-all productivity increased to 0.75 g per litre an hour for the invention from 0.31 g/1hour, and the maximal productivity increased to 2.63 g per litre an hour from 1.55 g/1 hour. Further, the consumption of methanol decreased from 2.99 g to 2.20 per 1 g of produced biomass in logarithmic phase, whereby the methanol yield coefficient increased to 0.46 from 0.34, whereby the over-all coefficient was 0.20. The methanol carbon conversion increased to 58.0% by weight from 42.77 percent by weight in logarithmic phase.

When the cultivation in the balanced medium according to the invention was finished, the medium and biomass were analyzed, and it was found that the proportional composition of the end product did not differ from the composition at the beginning of the cultivation and, further, did not differ from the composition in the biomass.

Analysis of the unbalanced medium showed that the end composition differed from the original composition primarily in an increase of the proportions of phosphorus, potassium, sulphur, and magnesium, and a reduction of the proportions of calcium and iron.

The optimal concentration of the balanced medium for cultivation of *Methylomonas methanolica* was determined by conducting cultivation tests using six differently concentrated nutrient solutions, whereby the generation time was determined. The concentrations were expressed as millimoles of phosphorus by the simplicity of determining this amount. Other nutrient elements were present in the above-given proportions. The generation time, as well as the length of the logarithmic phase, are set out in Table 1 below. The concentration of methanol was 100 mM.

Table 1

| Balanced Medium mM of P | Generation Time hrs | Length of Logarithmic phase (hrs) |
|---|---|---|
| 25 | 2.0 | 5.0 |
| 50 | 1.72 | 2.0 |
| 100 | 1.80 | 2.0 |
| 250 | 1.78 | 2.0 |
| 400 | 1.95 | 3.0 |
| 800 | 2.4 | 3.5 |

At a continuous cultivation and utilization of the balanced medium, further improved results were obtained as evident from below.

A chemostate-type of a continuous cultivation was carried out using separately both methanol and oxygen as limiting factors. In both cases, maximal production was 2.3 g of biomass per litre an hour at a dilution degree of 0.24 per hour and a concentration of biomass of 9.6 g per litre. The critical dilution degree is 0.33 per hour in an oxygen limited cultivation and 0.30 per hour in a methanol limited cultivation. The yield coefficient for methanol is 0.34 at conditions for a maximal production.

A turbistate-type of continuous cultivation was carried out using three types of flow control. In the first case, the flow control consisted of a turbidimeter. The light absorption measuring cell was placed in a by-pass conduit for the media flow and was connected to a photometer and a light source with phaser optic. In the other two cases, the flow was proportionally controlled to either consumption of methanol or to consumption of nitrogen. In all three cases, maximal production was 2.5 g per litre an hour at a concentration of biomass of 9.26 g per litre and a dilution degree of 0.27 per hour. The yield coefficient for methanol was 0.36. Any change of the proportional composition of the medium was not able to be proved after finished cultivation, neither in the chemostate case nor in the turbidistate case.

The process and the medium have been illustrated for cell mass production using a recently known bacteria strain, preliminarily called *Methylomonas methanolica*, NRRL B-5458, Which utilizes methanol as sole source of carbon. The process and the medium are also applicable in improving yield and growth of other cultivations of microorganisms which primarily have as their objective producing a biomass under optimal conditions. The process and the medium can also be suitably adapted to the production of other products related to the metabolism of the cells.

The same principles of obtaining the optimal growth factors may be used for many other microorganism cultivations as for *Methylomonas methanolica, NRRL B*-5458, and especially where the main product is a biomass and carbon dioxide.

The microorganisms obtained according to the process of the invention are useful as producers of enzymes as enzyme from Bacillus sp., producers of secondary metabolites, and producers of single cell protein, as above.

The foregoing disclosure is not intended to limit in any way the scope of the invention as defined by the following claims.

We claim:

1. A microbiological mineral nutrient medium for cultivating the microorganism *Methylomonas methanolica*, NRRL B-5458, to obtain maximal production of cell mass and maximal utilization of the medium, which comprises, in addition to carbon, the nutrient elements nitrogen (N), phosphorus (P), potassium (K), sulfur (S), calcium (Ca), magnesium (Mg), and iron (Fe), in weight proportions within the following ranges: 100 nitrogen; 22.5–27.5 phosphorus; 2.25–2.75 potassium; 8.1–9.9 sulfur; 1.35–1.65 calcium; 1.3–2.2 magnesium; and 2.25–2.75 iron.

2. A composition according to claim 1 wherein the nutrient elements are present in the following weight proportions: 100N; 25P; 2.5K; 9.0S; 1.5Ca; 2.0Mg; 2.5Fe.

3. A composition according to claim 1 wherein the source of carbon is methanol.

* * * * *